INVENTOR.
SEIZO MOTORA

June 4, 1968  SEIZO MOTORA  3,386,404
SHIP'S HULL ADAPTED FOR CONSIDERABLY REDUCING
VERTICAL FORCES CAUSED BY WAVES
Filed Aug. 22, 1966  3 Sheets-Sheet 2

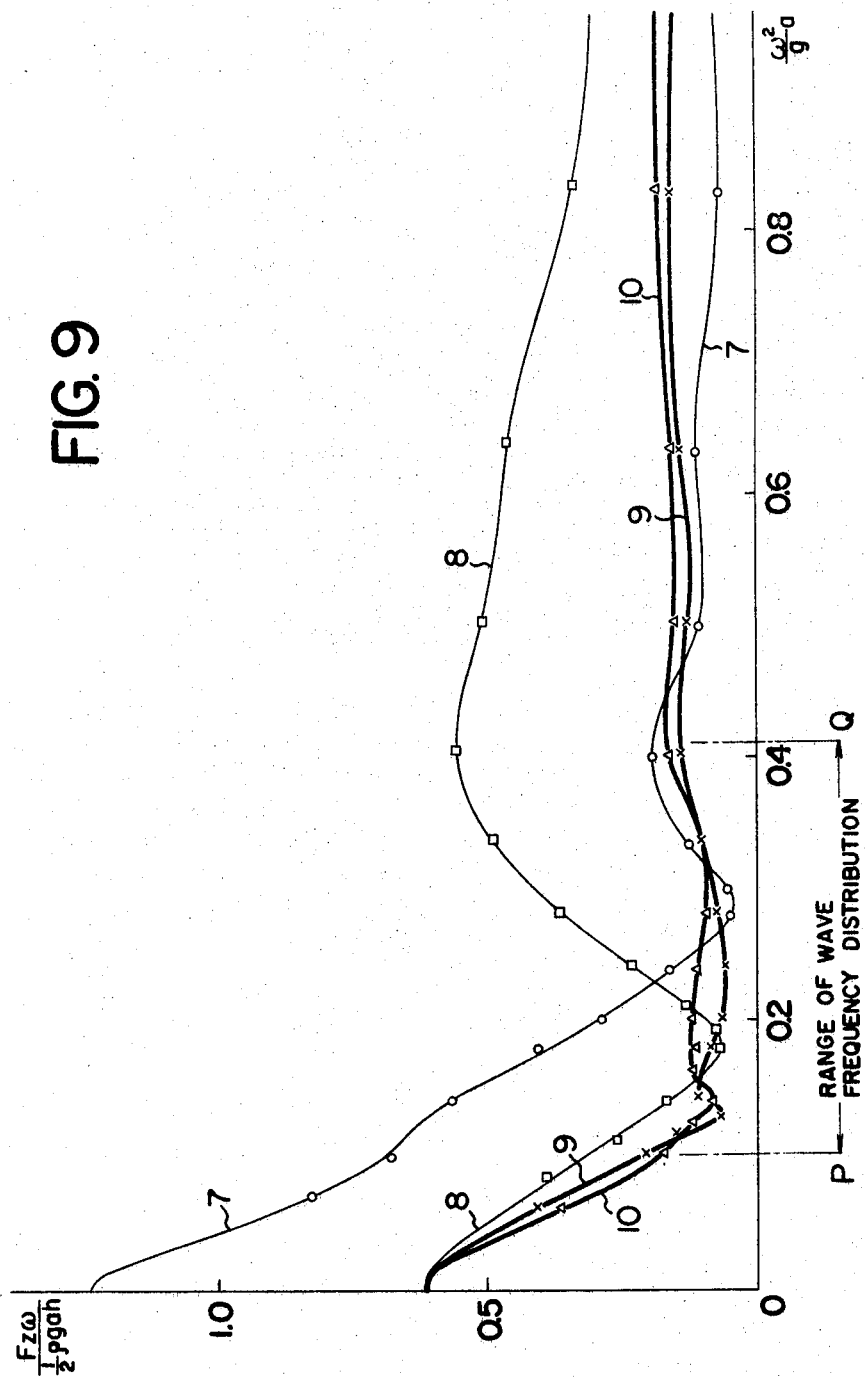

United States Patent Office 3,386,404
Patented June 4, 1968

3,386,404
SHIP'S HULL ADAPTED FOR CONSIDERABLY REDUCING VERTICAL FORCES CAUSED BY WAVES
Seizo Motora, 100 Komagome Kamifujimae-cho, Bunkyo-ku, Tokyo, Japan
Filed Aug. 22, 1966, Ser. No. 574,156
Claims priority, application Japan, Aug. 22, 1965, 40/50,915
9 Claims. (Cl. 114—56)

ABSTRACT OF THE DISCLOSURE

A submersible hull for supporting a super structure above the water wherein the hull is comprised of an inner and outer hull spaced from each other and secured to the upper surface of a hollow member having an oblong cross-section extending outwardly of the outer hull. The hollow member is disposed in communication with the interior of the inner hull and communication openings are provided in the outer hull below the surface of the water adjacent the hollow member to allow the water to communicate into and out of the space between said inner and outer hulls.

---

This invention relates to improvements in and relating to ship's hulls. More specifically, it relates to ship's hulls or similar ocean-floating and navigating vessels adapted to considerably reduce vertical forces caused by waves.

Ship's hulls and similar ocean-going floating vessels are naturally subjected to various and considerable rolling and pitching movements caused by water waves. Various efforts have been directed by those skilled in the art to suppress these disadvantageous movements of the hull. Hitherto proposed means for serving this purpose were designed substantially for generating counter forces so as to cancel the wave forces. In spite of these efforts, considerable pitching and heaving are encountered with conventional ship's hulls and give rise to unpleasant navigating feelings of the crew and passengers, lowered working efficiency of the crew, damages of cargo and hull, and finally the propelling efficiency of the hull. Boring in the sea-bottom will naturally be disturbed to a substantial degree by the aforementioned movements of the hull.

It is therefore the main object of the invention to provide a highly improved ship's hull, capable of suppressing vertical movements thereof caused by water waves to a possible minimum when considered within the practically encountered wave frequency range, for substantially obviating otherwise possible pitching and heaving of the hull and for reducing hull stresses caused by water waves.

Brief description of the drawings

FIGURE 9 is a graph showing various mathematical relations relative to the present invention.

As is commonly known, a ship's hull afloat on the water and of the conventional design is subjected to vertical forces caused by water waves and called among those skilled in the art Froude-Krylov's force which corresponds to the ship's bouyancy. In fact, however, the water waves are agitated by the hull and therefore the mutual interference must be taken into account.

Various formulae have been proposed to treat theoretically with this phenomenon, but the following formula is proposed for better adaptability:

$$F = r_1 k_z \rho V \ddot{Z} + r_2 N \dot{Z} + r_3 \rho g A Z$$

where $F$: vertical force acting on hull under the influence of wave, gr. (weight)
$k_z$: additional mass coefficient
$\rho$: density of water, gr./cm.$^3$
$V$: submerged volume of hull, cm.$^3$
$Z$: rise of wave above water surface, cm.
$N$: damping coefficient, gr. sec.
$g$: acceleration of gravity, cm./sec.$^2$
$A$: wetted perimeter, cm.$^2$
$r_1, r_2, r_3$: correction factors, functions of wave number:

$$K = \omega^2/g, \text{ further } \omega = \frac{2\pi}{T} (\text{sec.}^{-1})$$

where T denotes period expressed in seconds

The first term at the right side of the above formula represents a kind of inertia force and the third term denotes a buoyancy of the hull. Since it can be assumed that the wave performs periodic movements, the following relation will govern between the riste of wave, Z, and the value of $\ddot{Z}$ $$\ddot{Z} = -\omega^2 \cdot Z$$

Thus, the sum of the said two terms may become nil when the additional mass is selected to a proper value. The second term in the above formula represents a damping force which could not be reduced to nil, but it is possible to minimize the value to a negligible minimum. Therefore, the value of the vertical force invited by the wave can be reduced at a certian frequency almost to nil.

Now denoting this frequency by $\omega_0$, then we obtain $$\omega_0 = \sqrt{\frac{r_3 g A}{r_1 k_z V}}$$

In the case of conventional model of ship's hull, the value of $k_z \rho V$ (additional mass) is not so large that such phenomenon cannot take place with practical water waves. When, however, a specially designed model of hull has a relatively small value of A (wetted perimeter of the hull) in comparison with a selected larger value of V (submerged volume of the hull), the aforementioned relation can be realized, as ascertained by my profound experiments. In this case however, it can be said that the aforementioned phenomenon does happen to take place at a specific frequency and thus this would be difficult to realize when considering a relatively wide frequency distribution of sea waves. Further difficulty will arise from the non-variable relationship between the both values of A and V.

Figure 1:
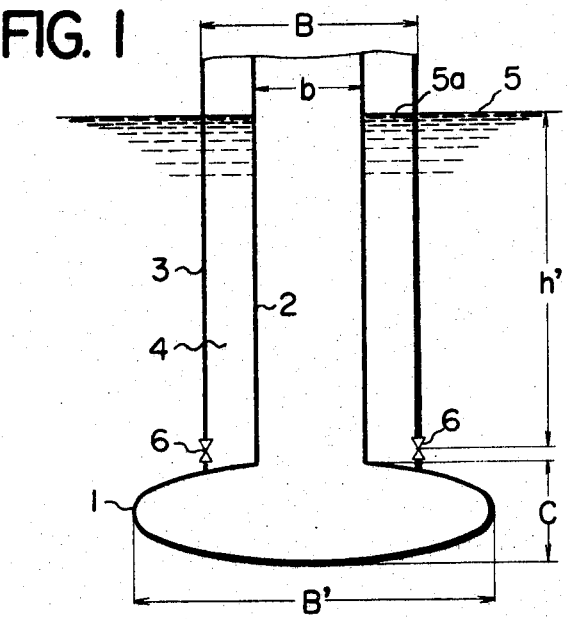
FIGURE 1 is a schematic view of a hull according to the present invention.

I devised however a specific model hull as shown in FIG. 1, and for the purpose of obviating the aforementioned difficulties and having the following main dimensions: B=12 cm.; b=6 cm.; B'=20 cm.; C=5 cm.; h'=19 cm.; length=50 cm.

In this figure, numeral 1 denotes a submerged and bulged-out portion having substantially an elliptic cross-section, which portion corresponds to the bottom of conventional ship"s hull. 2 denotes an inner hull proper emerging in the air above the free surface 5 of water in which the said portion 1 submerged. 3 denotes an outside jacket, again emerging in the air from the body of the water. The lowermost extremities of the walls of these both parts 2 and 3 are rigidly connected with the upper part of the bulged-out portion 1. The intermediate space defined by the walls of said both parts 2 and 3 and denoted by reference numeral 4 contains water. In order to establish communication of the interior space 4 with the ambient water, there is provided one or more of openings 6 in the outside wall and in close proximity of bulged-out portion 1. The free water surface of the contained water in the inner space 4 is shown by 5a.

For simplicity, the inner hull proper will be referred to as "smaller emerging part" and the outer jacket part 3 will be called "larger emerging part" hereinafter. The operation of the aforementioned improved hull is as follows:

When the hull is subjected to the action of waves of a lower frequency, the outside water is allowed to communicate with the interior of the intermediate space 4 through communicating openings 6, and the existence of the larger emerging part 3 can be neglected when considering the operation of the hull, which can be therefore considered to have only the smaller emerging part 2, in effect. Therefore, at this lower wave frequency, the vertical force to be invited by the waves could be deemed to be nil.

On the contrary, at a higher wave frequency, the communication of outside water with the interior of the intermediate space 4 through the openings 6 will become highly difficult and the inside water level 5a may be deemed as if it should remain at a constant height. Therefore, the operation characteristic of the hull can be deemed as if the inner smaller emerging portion has been dispensed with.

The difficulty of water communication is caused not only by fluid resistance through said openings 6, but also by the existence of the so-called zero-response frequency. If this frequency be expressed by $\omega_f$, then $$\omega_f = \sqrt{\frac{g}{h_o}}$$

$h_o$ means the mean depth of the said communicating openings 6. It will therefore be understood that the depth $h_o$ must have a considerable value and the greater the depth the better will become the results.

The experimental results with use of the hull model shown in FIG. 1 are shown in FIG. 9. The ordinate represents the wave force, F, divided by a force corresponding to the buoyancy, $$\frac{1}{2}\rho\, gah$$

the ratio represented by the ordinate amounting generally 0–1.5, while the abscissa represents the no dimensional wave number $$\frac{\omega^2}{g}a$$

amounting generally 0—∞. The range between P and Q is meant by that in which practical waves take place. In these terms, F, $\rho$ and $g$ have same meanings as before, and $a$: half the width, B′ shown in FIG. 1, of the submerged and bulged-out part, cm.
$h$: rise of water surface, cm.
$\omega$: frequency of wave.

In this graph, curve 7 represents the characteristic curve for the larger emerging part 3, while curve 8 shows the characteristic curve for the smaller emerging part 2. It will be observed from these curves that at respectively specified wave number, the respective wave force becomes nearly zero, while in other range the value amounts to a considerably high one. Curves 9 and 10 represent those for the modified hulls according to the principle of the invention. Curve 9 represents more specifically with a ratio 2 of the inside water surface area at 5a divided by the area of communicating openings at 6. Curve 10 is that which was obtained with an increased ratio 4 when expressed in the above meaning. It will be observed from these highly improved characteristic curves that within the range of wave number 0.1–0.4 which means a practically expectable wave frequency distribution range, the vertical force acting on the hull by wave amounts practically to nil. Therefore, it can be said that these characteristic curves are of highly recommendable nature.

The shape of the submerged and bulged-out part of the ship's hull should not be limited to the elliptical cross-section.

Figure 2:
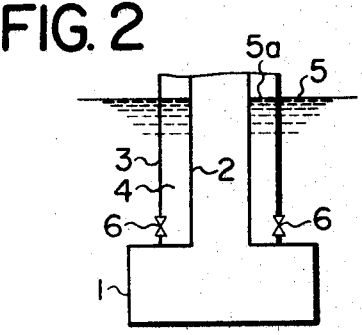
FIGURE 2 is a schematic view similar to FIGURE 1 showing a first modification thereof.

In FIG. 2, the shape has been modified to a rectangular one.

Figure 3:
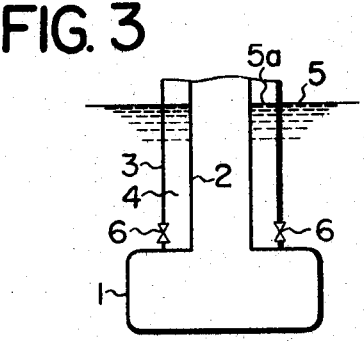
FIGURE 3 is a schematic view similar to FIGURE 1 showing a second modification thereof.

In FIG. 3, the part represents a rounded rectangle.

Figure 4:
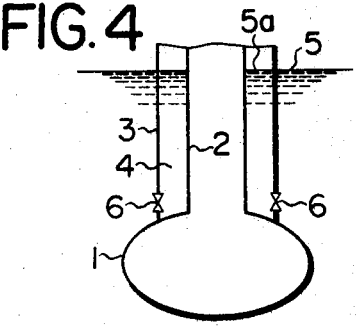
FIGURE 4 is a schematic view similar to FIGURE 1 showing a third modification thereof.

In FIG. 4, the elliptical configuration has been modified to that of an elipse more closely resembling a circle.

Figure 5:
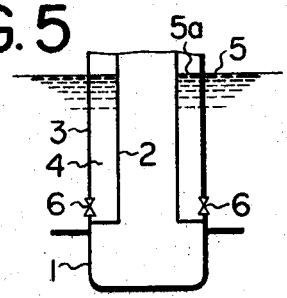
FIGURE 5 is a schematic view similar to FIGURE 1 showing a fourth modification thereof.

In FIG. 5, the bottom corners are only rounded.

Figure 6:
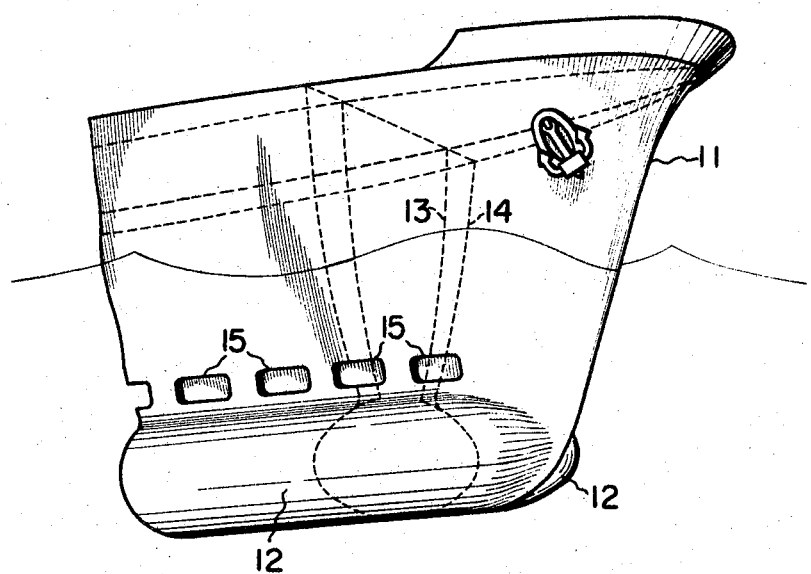
FIGURE 6 is a perspective view of a conventional ship hull incorporating the present invention therein.

From a practical view point, for instance, of ocean-going ships, the aforementioned theoretical considerations can be considerably modified. Common ship's hulls may therefore represent the principle of the invention at the bow portion or alternatively, or even in combination therewith, at the stern end. In FIG. 6, a ship's hull embodies only at its bow portion the principle of the invention. In this figure, 11 represents the bow. 12 represents the submerged bulged-out part, in close and upper proximity thereof, there being provided a plurality of communicating openings 15 bored through the hull plates. The bulged-out portion 12 corresponds substantially to the ship's bottom, preferably the double bottom. In continuation of the portion 12, and above the latter, there is a double-walled construction representing a smaller and inside emerging portion 13 and a larger and outside emerging portion 14, when expressed in the aforementioned sense, are formed, between which a level of water space exists, although not specifically shown.

The operation of the modified ship's hull is similar to that which has been treated theoretically hereinbefore. The overall area of the communicating openings 15 may preferably amount to about 5–30% of the water surface formed within the intermediate water chamber. It will be easily conceivable that with use of this modified and improved hull, disadvantageous pitching and heaving can be substantially suppressed and the propelling efficiency of the hull can be considerably improved.

Figure 7:
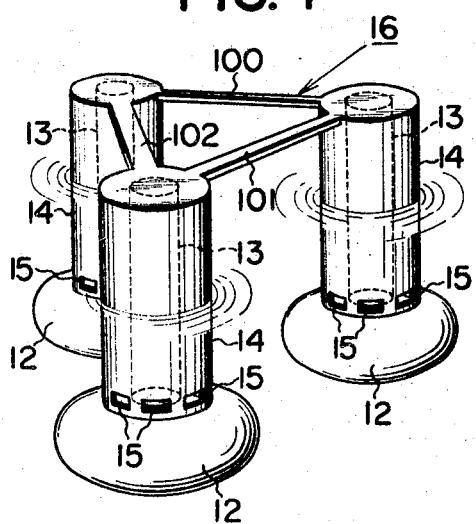
FIGURE 7 is a perspective view of a floating tower arrangement incorporating the present invention.

In a modification of the invention shown in FIG. 7, the floating hull comprises three double-walled vertical cylinders united rigidly together by connecting bars 100, 101 and 102. The corresponding parts are fitted with same reference numerals as before, for easy identification. This floating structure, generally denoted by 16, may be utilized as a floating platform on the sea, by fitting with a plane floor plate, not shown, on the uppermost end thereof, providing a very convenient means for a boring service or the like. It can be also utilized as a floating buoy. In this embodiment, the stresses in the hull can be correspondingly reduced, and therefore the total weight thereof can also be economized correspondingly.

Figure 8:
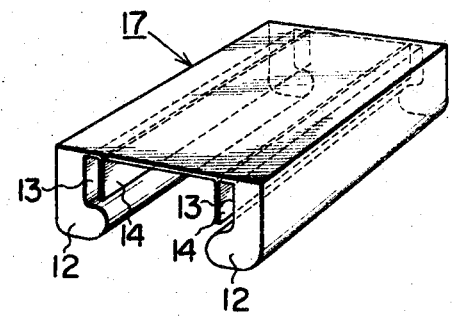
FIGURE 8 is a perspective view of a barge-like structure incorporating the present invention therein.

In a still modified embodiment shown in FIG. 8, there is shown a twin-hull boat 17, which can be utilized for a pusher barge line system with improved efficiency. It will be clear that in this case also the possible pitching and rolling can be considerably reduced in comparison with the conventional construction of a barge. This modified and improved construction may be fitted with bulging connections highly simplified and economized on account of reduced stresses to be encountered thereat.

In the foregoing, it has been mentioned that wave forces can be suppressed to a practically nil value, which however does not mean in any way a nulification of vertical movements of the hull. On account of practically no damping, movement of the hull may be larger than that of the conventionally designed hull. Thanks to smaller wave forces influencing upon the hull, these movements can be prevented by utilizing, for instance, an anti-pitching tank arrangement or the like counter measure, having considerably reduced capacity and dimensions.

On the contrary, when the invention is embodied into a rather complicated space configuration as in the case shown in FIG. 7, the damping is not nil and therefore the movement of the hull will be correspondingly reduced.

Of course it should be understood that there may be various different embodiments of the ship's hull without departing from the scope of the present invention.

Having now particularly described and ascertained the nature of my said invention, and in what manner the same is to be performed, I declare that what I claim is:

1. A ship's hull, comprising a plurality vertical elements rigidly connected with each other, each of said elements comprising in turn: an inner hollow cylinder, an outer hollow cylinder and a bulged-out hollow member positioned directly below said both cylinders and rigidly connected therewith, the interior space of said hollow member being kept in communication with the interior of said inner cylinder, and a plurality of communication openings bored through said outer cylinder in close proximity of said hollow member for allowing a mutual communication of water between the inner space defined by said both cylinders, and the outside of said outer cylinder.

2. A submersible hull for supporting a super structure above the water comprising an inner hull, an outer hull spaced from said inner hull to define a hollow chamber, a stabilizing member having a generally oblong cross-section secured to the bottom of said inner and outer hulls and protruding beyond said outer hull, said stabilizing member having a hollow interior portion in communication with the interior of said inner hull and communication openings formed through said outer hull below the water adjacent said stabilizing member to allow communication of water into and out of the space between said inner and outer hulls.

3. A submersible hull as set forth in claim 2 wherein the total sum area of the communication openings is between five percent and 30 percent of the free water surface in the space between said inner and outer hulls.

4. A submersible hull as set forth in claim 2 wherein said stabilizing member is provided with an eliptical cross-section.

5. A submersible hull as set forth in claim 2 wherein said stabilizing member is provided with a rectangular cross-section.

6. A submersible hull as set forth in claim 2 wherein said stabilizing member is provided with a rounded rectangular cross-section.

7. A submersible hull as set forth in claim 2 wherein said inner hull is in the shape of a conventional ship's hull having a tapered, pointed bow portion and wherein said outer hull is provided only adjacent said tapered, pointed bow portion on opposite sides thereof to define a pair of hollow chambers, said stabilizing member being provided only in the area of said tapered, pointed bow portion.

8. A submersible hull as set forth in claim 2 wherein said inner hull is formed as a hollow cylindrical member and said outer hull is formed as a hollow cylindrical member concentrically disposed about said inner hull.

9. A submersible hull as set forth in claim 2 wherein two of said hulls are provided with an elongated configuration and are connected together in parallel relation by platform means.

References Cited

UNITED STATES PATENTS

| | | | |
|---|---|---|---|
| 1,427,526 | 8/1922 | Frahm | 114—125 |
| 1,599,311 | 9/1926 | Chimang | 114—56 |
| 3,224,402 | 2/1965 | Kobus | 114—125 XR |

ANDREW H. FARRELL, *Primary Examiner.*